Patented Feb. 14, 1950

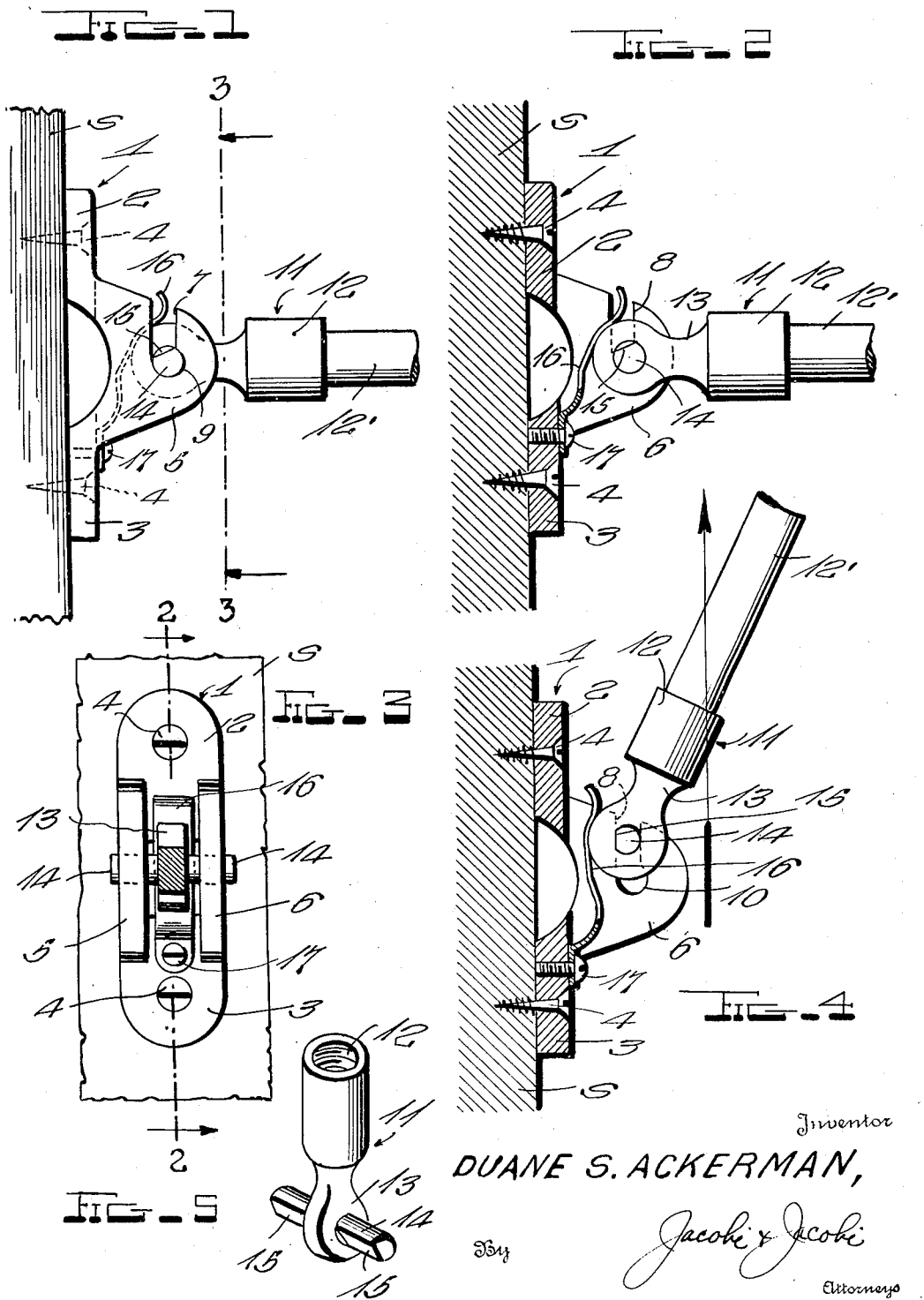

2,497,337

UNITED STATES PATENT OFFICE 2,497,337

AWNING HINGE

Duane S. Ackerman, Topeka, Kans.

Application May 3, 1946, Serial No. 667,234

2 Claims. (Cl. 16—172)

My invention relates to new and useful improvements in hinges, and more particularly to awning hinges, the primary object being to provide a device comprising detachable pivotally connected parts, so constructed that said parts may be readily assembled or disassembled when said parts are particularly related relative to each other.

My invention is primarily intended for use in awning supports wherein the force of gravity assists in assembling the device and aids in maintaining the parts in assembled condition.

It is an object of my invention to provide a novel bracket support provided with spaced bracket arms projecting in substantially parallel relation from one side of the base of the bracket. The arms being provided with aligned slotted portions having the slots extending upwardly and opening on the upper edge portions of the arms. The slotted portions being reduced, preferably, on their forward edges, so that the slots are provided with forwardly extending enlargements in alignment with each other and at one side of the bottoms of the slots.

It is also an object of my invention to provide a complemental pivoted part or member comprising, preferably, a threaded socket having an arm or stem projecting therefrom, preferably in axial alignment with the socket. The arm is provided with a transverse pin adjacent its free end. The pin is flattened preferably on, at least, one side so that the pin may be said to have a major diameter at right angles to its minor diameter.

It will be understood that I have provided parts or members that may be brought together into pivoted relation and said members readily assembled and disassembled.

In order to prevent accidental disassembly of the members, I provide a spring located on one of the members to bear against the other member.

Other objects and advantages will be revealed in the detailed description of the accompanying drawings.

In the accompanying drawing forming a part of this application

Figure 1 is a side elevation of my invention showing the pivotal members in normal assembled relation;

Figure 2 is a vertical section taken approximately on the line 2—2 of Figure 3 looking in the direction of the arrows;

Figure 3 is a transverse section taken approximately on line 3—3 of Figure 1 looking in the direction of the arrows;

Figure 4 is a vertical section similar to Figure 2 but showing a relative position of the members when assembling or disassembling; and Figure 5 is a perspective view of the socket member and its cross pin.

In the specification and drawings, the reference characters identify the particular parts, portions and elements.

In my novel invention, the bracket 1 is adapted to be secured to a support S. The bracket 1 is, preferably, provided with a pair of base ears 2 and 3. The ears are provided with apertures whereby the bracket 1 may be secured to the support S by suitable fastening means, such as, wood screws or the like, as indicated by 4. The bracket 1 is also provided, preferably, with a pair of arms 5 and 6. The arms have slotted portions therein providing slots 7 and 8 which extend upwardly through the upper edges of the arms 5 and 6, respectively. Each slotted portion is enlarged, preferably, in a position remote from the support S as indicated at 9 and 10.

The bracket 1 pivotally supports a complemental fastener 11 comprising a T-end coupling element or fastener. Preferably, the T-end fastener is provided with a screw threaded socket 12. The T-end fastener is provided with a transversely apertured stem 13 which receives a transversely arranged pin 14. The pin 14 is preferably assembled with a so-called driving fit whereby it is retained in proper position, as shown, against accidental displacement. The transversely arranged pin 14 is provided on, at least, one of its sides with a flattened or reduced portion 15. It is to be noted that the reduced portions of the pin 14 are, thereby, provided with both major and minor diameters. The major diameter extends through the center of the pin 14 and parallel to the flattened portions of the pin. The minor diameter extends through the center of the pin 14 and at right angles to both the flattened portions 15 and the major diameter. The minor diameter represents approximately a measure of the width of the narrow portions of the slots 7 and 8. The major diameter of the pin 14 is approximately a measure of the enlarged portions of the slots 7 and 8 at the position of the enlargements 9 and 10. It is here pointed out that when the pin 14 has its major diameter within the enlarged portions of the slots and arranged transversely of the narrow portions of the slot then the bracket 1 and its complemental T-end coupling element are locked together. When the major diameter is pivoted to a position parallel with the narrow portions of the slots 7 and 8, then the parts are not locked together and the T-end coupling element may be lifted out of the bracket 1.

I have shown a T-end fastener provided with a screw threaded socket 12 to receive an awning supporting rod $12^1$, but it is self-evident that the screw threaded socket 12 could be eliminated and the T-end coupling could be formed directly on the rod $12^1$. In this connection, however, it is to be noted, that the use of the threaded socket is convenient to use in connection with the rod $12^1$, since the rod $12^1$ may be cut to any suitable length and then threaded to be received by the socket 12.

In order to prevent or retard the accidental removal of the T-end coupling from the bracket 1, I have provided the bracket with a leaf spring 16 secured thereto by any suitable fastening means, such as a lag bolt 17 passing through an apertured end portion of the spring and into a screw threaded aperture or socket in the base portion of the bracket 1. The spring 16 is biased toward and bears against the end portion of the stem 13 to maintain the pin 14 normally in the enlarged portions 9 and 10 of the slots 7 and 8. By the use of the spring 16, it is apparent that a strong wind or a gust of wind could not readily raise the awning and lift the T-end coupling out of the bracket against the tension of the spring 16. In spite of air currents and wind the spring 16 as applied also prevents vibration and chattering of the coupling connection of the bracket 1 and the T-end coupler element 11.

Since my invention is primarily for use in connection with awnings and awning supports it is to be noted that the upwardly projecting slots 7 and 8, as shown, and described, invoke the aid of the force of gravity to assist in maintaining the parts in assembled condition.

The operation of assembling and disassembling of my pivotal self-locking joint and support appears to be self-evident from the detailed description above given.

It can be now appreciated that I have produced a novel but simple structure which lends itself to time saving, as well as to other virtues clearly pointed out in this specification.

What I claim is:

1. In an awning frame hinge, a mounting bracket comprising a base portion adapted to be fastened to a support, and a pair of spaced arms projecting at right angles from said base portion, said arms having transversely alined slots extending through their upper edges and being enlarged at their inner end portions; and a complemental fastener element comprising a socket portion adapted to be connected to an awning frame rod, a stem portion projecting axially of the socket portion and adapted to occupy the space between said pair of mounting bracket arms, and a pin extending transversely through said stem to occupy the enlarged inner end portions of the bracket arm slots for pivotally connecting the fastener element to the mounting bracket, each end portion of said pin being flattened on one side to provide a reduced diameter substantially equal to the width of the entrance portion of its cooperating bracket arm slot so that the pin end portions may be moved into and out of said slots only when the fastener element occupies a certain angular position with respect to the plane of the mounting bracket base.

2. An awning frame hinge as defined in claim 1 further characterized by a spring member attached to the mounting bracket base and biased against the stem portion of the fastener element to yieldably resist removal of the pin from the enlarged inner end portions of the bracket arm slots when the fastener element occupies said certain angular position with respect to the plane of the mounting bracket base.

DUANE S. ACKERMAN.

REFERENCES CITED

The following references are of record in the file of this patent:

UNITED STATES PATENTS

| Number | Name | Date |
|---|---|---|
| 658,115 | Murray | Sept. 18, 1900 |
| 678,701 | Tuor | July 16, 1901 |
| 1,891,118 | Stockstrom | Dec. 18, 1932 |
| 2,346,977 | La Sha | Apr. 18, 1944 |